(12) United States Patent
    Funahara (10) Patent No.: US 11,108,867 B2
(45) Date of Patent: Aug. 31, 2021

(54) REMOTE OPERATION SYSTEM AND MEASUREMENT SYSTEM

(71) Applicant: HIOKI DENKI KABUSHIKI KAISHA, Nagano (JP)

(72) Inventor: Ippei Funahara, Nagano (JP)

(73) Assignee: HIOKI DENKI KABUSHIKI KAISHA, Nagano (JP)

( * ) Notice: Subject to any disclaimer, the term of this patent is extended or adjusted under 35 U.S.C. 154(b) by 344 days.

(21) Appl. No.: 16/138,178

(22) Filed: Sep. 21, 2018

(65) Prior Publication Data

US 2019/0098093 A1    Mar. 28, 2019

(30) Foreign Application Priority Data

Sep. 28, 2017    (JP) .............................. JP2017-187489

(51) Int. Cl.
    *H04L 29/08*    (2006.01)
    *G01D 9/00*    (2006.01)
    *G01D 7/00*    (2006.01)

(52) U.S. Cl.
    CPC ............. *H04L 67/125* (2013.01); *G01D 7/00* (2013.01); *G01D 9/005* (2013.01);
    (Continued)

(58) Field of Classification Search
    CPC ... H04L 29/06; H04L 29/12047; H04L 69/16; H04L 69/162; H04L 67/125;
    (Continued)

(56) References Cited

U.S. PATENT DOCUMENTS

| | | | | | |
|---|---|---|---|---|---|
| 6,133,847 | A | * | 10/2000 | Yang | G05B 19/0426 340/12.25 |
| 7,555,556 | B2 | * | 6/2009 | Motoyama | H04L 61/2015 709/227 |

(Continued)

FOREIGN PATENT DOCUMENTS

| | | |
|---|---|---|
| JP | 2001-160811 | 6/2001 |
| JP | 2006-148661 A | 6/2006 |

OTHER PUBLICATIONS

Official Action in Japanese Pat. Appl. No. 2017-187489, dated Jul. 20, 2021.

*Primary Examiner* — Elias Desta
(74) *Attorney, Agent, or Firm* — Greenblum & Bernstein, P.L.C.

(57) ABSTRACT

A remote operation system enables remote operation by an operation terminal of an electronic appliance, which executes a process according to control data from an external apparatus and outputs response data to the external apparatus, via the Internet. The remote operation system includes a first processor connected to the Internet and a second processor locally connected to the electronic appliance and set up for access by the first processor via the Internet. The second processor executes a first process that establishes a first path for reception of transmission data via the Internet from the first processor at any time. The first processor executes a second process that instructs the second processor via the first path to establish a second path for end-to-end communication to enable remote operation of the electronic appliance by the operation terminal via the Internet.

14 Claims, 3 Drawing Sheets

(52) U.S. Cl.
CPC ........ *H04L 29/08099* (2013.01); *H04L 67/02* (2013.01); *H04L 67/025* (2013.01)

(58) Field of Classification Search
CPC . H04L 29/08099; H04L 67/02; H04L 67/025; G01D 7/00; G01D 9/005
See application file for complete search history.

(56) References Cited

U.S. PATENT DOCUMENTS

| | | | |
|---|---|---|---|
| 9,794,133 B2 * | 10/2017 | Pohja | .................... H04W 84/18 |
| 2006/0126603 A1 | 6/2006 | Shimizu et al. | |

* cited by examiner

REMOTE OPERATION SYSTEM AND MEASUREMENT SYSTEM

FIELD OF THE INVENTION

The present invention relates to a technology that remotely operates an electronic appliance via the Internet using an operation terminal.

DESCRIPTION OF THE RELATED ART

In one widely-used arrangement in the field of measuring instruments, for example, measurement data is transferred from a measuring instrument via a network to a computer or the like (hereinafter referred to as a "processing terminal") and various processing, such as data analysis processing, is performed at the processing terminal. To have such processing carried out, it is necessary to operate the processing terminal, for example, to access the measuring instrument and instruct the measuring instrument to perform transmission of measurement data and the like.

Here, aside from a configuration where the IP addresses assigned to network-connected appliances, such as measuring instruments and the processing terminal, are fixed, it is typically possible for the assigned IP address to differ every time a network-connected appliance connects to the network. Accordingly, when various data is to be transmitted and received via the network between a measuring instrument and a processing terminal, it is necessary for an operator who operates the processing terminal to specify the IP address assigned to the measuring instrument and access the measuring instrument from the processing terminal and/or for an operator who operates the measuring instrument to specify the IP address assigned to the processing terminal and access the processing terminal from the measuring instrument.

On the other hand, Japanese Laid-open Patent Publication No. 2001-160811 discloses an invention that makes the task of specifying addresses described above unnecessary. In more detail, the measuring instrument according to the invention disclosed in the cited patent literature is equipped with an electronic mail (hereinafter "e-mail") transmission function according to SMTP and also an IP address notifying function that automatically transmits the IP address that has been assigned to the measuring instrument via e-mail to an e-mail address that has been set in advance. By doing so, it becomes possible for the operator of the processing terminal to specify the IP address of the measuring instrument based on the transmitted e-mail. Accordingly, when connecting the processing terminal to the measuring instrument, it is not necessary to specify the IP address assigned to the measuring instrument (or the processing terminal) in advance, which means that even users who are unused to handling network-connected appliances can easily access measuring instruments from a processing terminal.

SUMMARY OF THE INVENTION

However, the invention disclosed in the cited patent literature has the following problem to be solved. In more detail, the invention disclosed in the cited patent literature uses a configuration where the information required to access the measuring instrument from a processing terminal is transferred by transmitting an IP address that has been assigned to the measuring instrument by e-mail to an arbitrary e-mail address.

With the configuration described above, it is still necessary to perform a task of copying a character string of the IP address written in the e-mail and pasting the character string into an application for connecting to the measuring instrument or the address bar of an Internet browser. This means that as before, the task of accessing a measuring instrument is still troublesome. At present, there are certain locations where the use of e-mail is restricted for security reasons, such as to prevent information from leaking. To access a measuring instrument and acquire measurement data using a processing terminal set up at such a location, it is necessary to receive the e-mail transmitted from the measuring instrument at a location where the use of e-mail is unrestricted, to write down the IP address of the measuring instrument on a piece of paper, to carry this piece of paper to the location where the processing terminal is set up, and then input the IP address of the measuring instrument. This means that for this kind of environment, the task of accessing a measuring instrument from a processing terminal is extremely troublesome.

When a processing terminal has a plurality of users, it is necessary to provide a shared e-mail address that can be received by each user. In addition, when IP address information has been transmitted using e-mail, there is the risk of the e-mail being improperly received by someone aside from the authorized users, which creates the risk of unauthorized access to the measuring instrument. In addition, measuring instruments of this type are configured so as to also be capable of standalone use without information being transmitted and received to and from a processing terminal or the like. For users who use a measuring instrument in this way, the presence of unnecessary functions (that is, the e-mail transmission function and IP address notifying function) results in an increase in the manufacturing cost of the measuring instrument.

The present invention was conceived in view of the problems described above and has a principal object of providing a remote operation system and a measurement system that make troublesome tasks unnecessary, avoid a situation where unauthorized accesses are performed, and are capable of reducing the manufacturing cost.

To achieve the stated object, a remote operation system according to the present invention is a remote operation system that enables remote operation of an electronic appliance, which is capable of executing a process set in advance in keeping with control data from an external apparatus and outputting response data relating to the process set in advance to the external apparatus, via the Internet by an operation terminal as the external apparatus that is capable of accessing arbitrary resources connected to the Internet, the remote operation system comprising: a first processor connected to the Internet; and a second processor that is locally connected to the electronic appliance and set up so as to be capable of access by the first processor via the Internet, wherein the second processor executes a first process that establishes a first communication path that enables reception of transmission data via the Internet from the first processor at any time, and the first processor executes a second process that instructs the second processor via the first communication path to establish a second communication path for performing end-to-end communication between the electronic appliance and the operation terminal to enable remote operation of the electronic appliance by the operation terminal via the Internet.

Also, in the remote operation system according to the present invention, the first processor executes the second process when a start of remote operation of the electronic appliance by the operation terminal has been indicated by the operation terminal that has accessed the first processor via the Internet, the second processor executes a third process that establishes the second communication path that enables two-way communication between the electronic appliance and the first processor via the second processor in accordance with an instruction from the first processor given by the second process, the first processor executes a fourth process that generates address data that enables access to the electronic appliance via the second communication path established by the third process and transmits the address data via the Internet to the operation terminal and permits end-to-end communication between the electronic appliance and the operation terminal, and the electronic appliance is remotely operated by the operation terminal by relaying the control data, which has been transmitted by the operation terminal accessing an address in the address data, to the electronic appliance using the first processor and the second processor and relaying the response data transmitted by the electronic appliance to the operation terminal using the first processor and the second processor.

Further, a measurement system according to the present invention comprises: the above-described remote operation system; a measuring instrument as the electronic appliance; and the operation terminal, wherein the measurement system is configured so as to be capable of executing, by remote operation by the operation terminal, at least one of: a measurement process by the measuring instrument; and a transmission process from the measuring instrument to the operation terminal of a result of the measurement process.

According to the above remote operation system and measurement system, in the same way as the invention disclosed in the patent literature cited earlier, it is unnecessary to fix the IP addresses of the electronic appliances (measuring instruments) or specify the IP addresses of the electronic appliances (measuring instruments), and possible, by reliably relaying the transmission and receiving of the control data and the response data between the electronic appliance (measuring instrument) and the operation terminal via the second communication path established by the second processor, to reliably remotely operate the electronic appliance (measuring instrument) via the Internet using an operation terminal or the like. Also, since it is not necessary to provide the electronic appliance (measuring instrument) with an e-mail transmission function or an IP address notifying function, it is possible to sufficiently reduce the manufacturing cost of the electronic appliance (measuring instrument). In addition, since no notification of the IP address assigned to the electronic appliance (measuring instrument) is given using e-mail or the like, it is possible to favorably avoid a situation where the IP address of the electronic appliance (measuring instrument) leaks and is subjected to unauthorized access.

Also, with the remote operation system according to the present invention, in the third process, the second processor establishes the second communication path that is capable of encrypted communication.

Also, according to the above remote operation system and a measurement system equipped with the remote operation system, due to the second processor establishing the second communication path that is capable of encrypted communication in the third process, it is possible to even more favorably avoid a situation where someone aside from authorized users can see the operation state of an electronic appliance (measuring instrument) and/or make unauthorized access to the electronic appliance (measuring instrument) and perform a remote operation.

Further, in the remote operation system according to the present invention, the first processor executes encrypted communication when communicating with the operation terminal via the Internet.

According to the above remote operation system and a measurement system equipped with the remote operation system, due to the first processor executing encrypted communication when communicating via the Internet with the operation terminal, it is possible to favorably avoid a situation where someone aside from authorized users can see the operation state of the electronic appliance (measuring instrument) and/or make unauthorized access to the electronic appliance (measuring instrument) and perform a remote operation.

Also, in the remote operation system according to the present invention, the first processor executes a fifth process that gives an instruction, via the first communication path, to the second processor to close the second communication path when the control data indicating an end of remote operation has been transmitted from the operation terminal that is performing remote operation of the electronic appliance, and the second processor executes a sixth process that closes the second communication path in accordance with the instruction from the first processor.

Also, according to the above remote operation system and a measurement system equipped with the remote operation system, due to the first processor executing the fifth process that instructs, via the first communication path, the second processor to close the second communication path when control data that indicates the end of the remote operation has been transmitted from the operation terminal that is performing remote operation of the electronic appliance (measuring instrument) and the second processor executing the sixth process that closes the second communication path in accordance with the instruction from the first processor, it is possible, in response to the risk of unauthorized access to the electronic appliance (measuring instrument) being performed using the second communication path which could occur if a state where the second communication path is established were maintained even after the end of remote operation, to close the second communication path when the second communication path is no longer needed and thereby favorably prevent such unauthorized access.

Further, in the remote operation system according to the present invention, the first processor executes an authentication process when the operation terminal has accessed the first processor via the Internet and executes the second process when it has been determined that access to the electronic appliance is permitted.

According to the above remote operation system and a measurement system equipped with the remote operation system, due to the first processor executing an authentication process when the operation terminal has accessed the first processor via the Internet and executing the second process when it has been determined that access to the electronic appliance (measuring instrument) is permitted, use of the measurement system by someone aside from authorized users is reliably prevented, and as a result, it is possible to more favorably prevent a situation where someone aside from authorized users can see the operation state of an electronic appliance (measuring instrument) and/or make unauthorized access to the electronic appliance (measuring instrument) and perform a remote operation.

Also, in the remote operation system according to the present invention, the second processor includes a communicator, which connects to a mobile telephone communication network capable of connecting to the Internet, and is configured to be capable of connecting to the first processor via the mobile telephone communication network and the Internet.

According to the above remote operation system and a measurement system equipped with the remote operation system, by constructing the second processor so as to include the communicator, which connects to the mobile telephone communication network that is capable of connecting to the Internet, and therefore be capable of connecting to the first processor via the mobile telephone communication network and the Internet, it is possible to easily use the remote operation system and the measurement system even when a local area network capable of connecting to the Internet is not constructed and when use of an existing local area network capable of connecting to the Internet is not permitted.

It should be noted that the disclosure of the present invention relates to the contents of Japanese Patent Application No. 2017-187489 that was filed on Sep. 28, 2017, the entire contents of which are herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a remote operation system and a measurement system according to the present invention will now be described with reference to the attached drawings.

Figure 1:
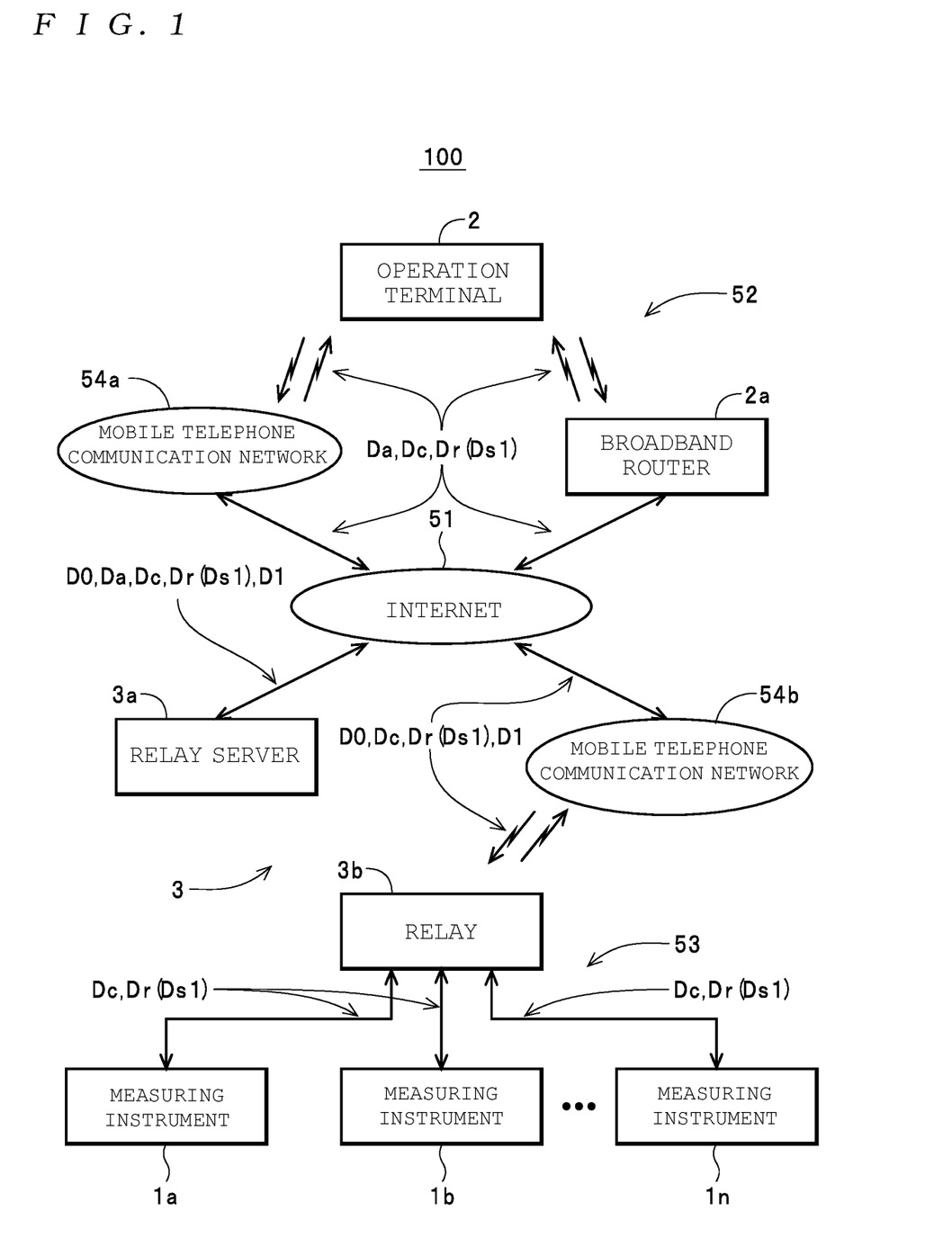
FIG. 1 is a diagram depicting the configuration of a measurement system 100.

A measurement system 100 depicted in FIG. 1 is one example of a "measurement system" according to the present invention and includes a plurality of measuring instruments 1a, 1b, . . . , 1n, an operation terminal 2, and a remote operation system 3.

Figure 2:
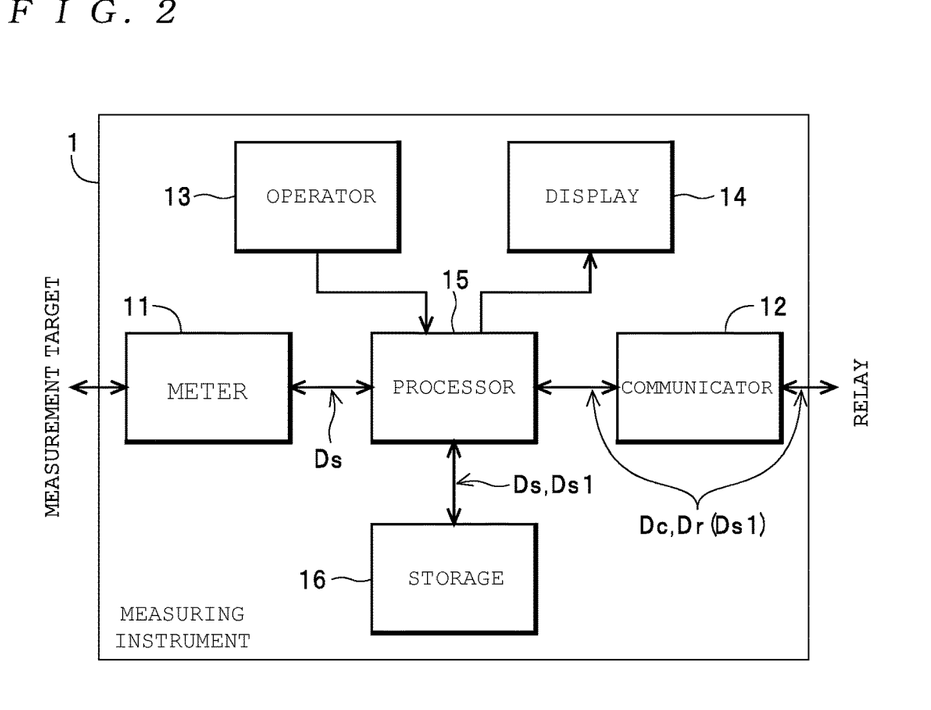
FIG. 2 is a diagram depicting the configuration of a measuring instrument 1.

The measuring instruments 1a, 1b, . . . , 1n (hereinafter referred to as the "measuring instruments 1" when no distinction is made) are examples of "measuring instruments" as "electronic appliances" for the present invention, and are configured so as to be capable of executing various measurement processes for a measurement target, not illustrated. As described later, the measuring instruments 1 are configured so as to be capable of executing processing that is set in advance in keeping with control data Dc transmitted from an "external apparatus", such as the operation terminal 2, and transmitting response data Dr to the "external apparatus". Note that although an example of the measurement system 100 that is equipped with a plurality of measuring instruments 1 is described here, the number of "electronic appliances (measuring instruments)" in the system may be one. As depicted in FIG. 2, each measuring instrument 1 includes a meter 11, a communicator 12, an operator 13, a display 14, a processor 15, and storage 16.

As described later, the meter 11 executes a measurement process in accordance with control by the processor 15 and outputs a measurement value Ds. As one example, the communicator 12 is constructed of a wired LAN communication module and transmits and receives various data by connecting via a wired LAN cable to various network-connected appliances in accordance with control by the processor 15. Note that in place of a wired LAN communication module (or in addition to a wired LAN communication module), it is also possible to construct the communicator 12 so as to include a wireless LAN communication module and/or a wireless communication module that is compatible with Bluetooth (registered trademark) standard. The operator 13 includes operation switches for setting operation conditions of the measuring instrument 1 and for starting and stopping measurement processes by the meter 11. The operator 13 outputs operation signals in keeping with operations of the switches to the processor 15. The display 14 displays the operation state of the measuring instrument 1, the result of the measurement process by the meter 11, and the like in accordance with control by the processor 15.

The processor 15 performs overall control of the measuring instrument 1. More specifically, the processor 15 executes a measurement process by controlling the meter 11, generates measurement result data Ds1 based on the measurement value Ds outputted from the meter 11, and stores the measurement result data Ds1 in the storage 16. Here, in addition to executing a control process that controls the meter 11 to execute a measurement process in accordance with an operation of the operator 13, as described later, the processor 15 is configured so as to be capable of executing a control process that controls the meter 11 to execute a measurement process in accordance with control data Dc from an external apparatus. The processor 15 also executes a process that reads the measurement result data Ds1 from the storage 16 and transmits the measurement result data Ds1 from the communicator 12 in accordance with control data Dc from an external apparatus. The storage 16 stores operation programs and computation results of the processor 15, as well as the measurement value Ds and/or the measurement result data Ds1 described above.

Figure 3:
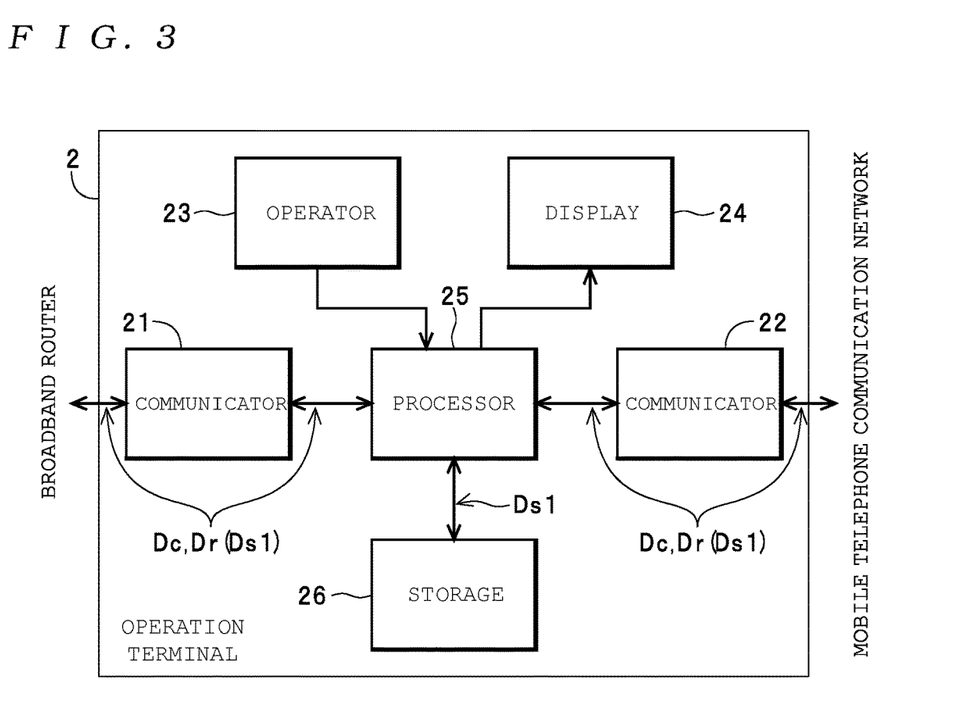
FIG. 3 is a diagram depicting the configuration of an operation terminal 2.

The operation terminal 2 corresponds to an "operation terminal as an external apparatus that is capable of accessing arbitrary resources (various information processing systems, information processing terminals, and the like) connected to the Internet". As one example, the operation terminal 2 is constructed of a personal computer or an existing mobile information processing terminal, such as a tablet terminal or a smartphone. As depicted in FIG. 3, the operation terminal 2 includes communicators 21 and 22, an operator 23, a display 24, a processor 25, and storage 26.

As one example, the communicator 21 is constructed of a wireless LAN communication module and transmits and receives various data by connecting via a wireless LAN to various network-connected appliances in accordance with control by the processor 25. Note that in place of a wireless LAN communication module (or in addition to a wireless LAN communication module), it is also possible to construct the communicator 21 so as to include a wired LAN communication module and/or a wireless communication module that is compatible with Bluetooth (registered trademark) standard. As one example, the communicator 22 is constructed of a wireless communication module that is capable of communication in accordance with a mobile communication standard such as 3G, 4G, or LTE, and transmits and receives various data via a mobile telephone communication network 54 in accordance with control by the processor 25.

As one example, the operator 23 includes a touch panel and as described later is constructed so as to be capable of giving instructions for operations that access the measuring instruments 1 and for reception of measurement result data Ds1 from the measuring instruments 1 and a procedure that analyzes the measurement result data Ds1. Note that although the operation terminal 2 according to the present embodiment is constructed so as to be capable of connecting to and using external input devices, such as a keyboard and/or a mouse as external appliances, operations that use such external input devices are omitted from the drawings and this description. The display 24 displays various display screens in accordance with control by the processor 25.

The processor 25 performs overall control of the operation terminal 2. More specifically, the processor 25 executes a variety of application software that has been installed in the operation terminal 2. Here, in the present embodiment, as described later, an example where an Internet browser (hereinafter simply "browser") installed in the operation terminal 2 is used to access the measuring instruments 1 and acquire the measurement result data Ds1 and the like will be described. The storage 26 stores programs of a variety of application software that includes the browser mentioned above, the measurement result data Ds1 transmitted from the measuring instruments 1 as described later, and the like.

Note that in the present embodiment, as depicted in FIG. 1, as one example, a LAN 52 is constructed by a broadband router 2a at a usage location of the operation terminal 2 to produce a state where the operation terminal 2 is capable of connecting to the Internet 51 via the LAN 52 (that is, via the broadband router 2a).

On the other hand, the remote operation system 3 is one example of a "remote operation system" according to the present invention and includes a relay server 3a and at least one relay 3b.

The relay server 3a is one example of a "first processor connected to the Internet" and has a function for relaying communication between the measuring instruments 1 and operation terminals, such as the operation terminal 2. More specifically, the relay server 3a is a server that is set up so as to be managed by a manager of the measurement system 100 (the remote operation system 3) and is continuously connected to the Internet 51. As described later, the relay server 3a is provided with dedicated URLs to which an operation terminal 2 or the like connect when the measuring instruments 1 are accessed from the operation terminal 2 or the like, and, together with the relay 3b, manages connections between appliances (such as the operation terminal 2) that have connected to these URLs and the measuring instruments 1 and the transmission and reception of various data.

Figure 4:
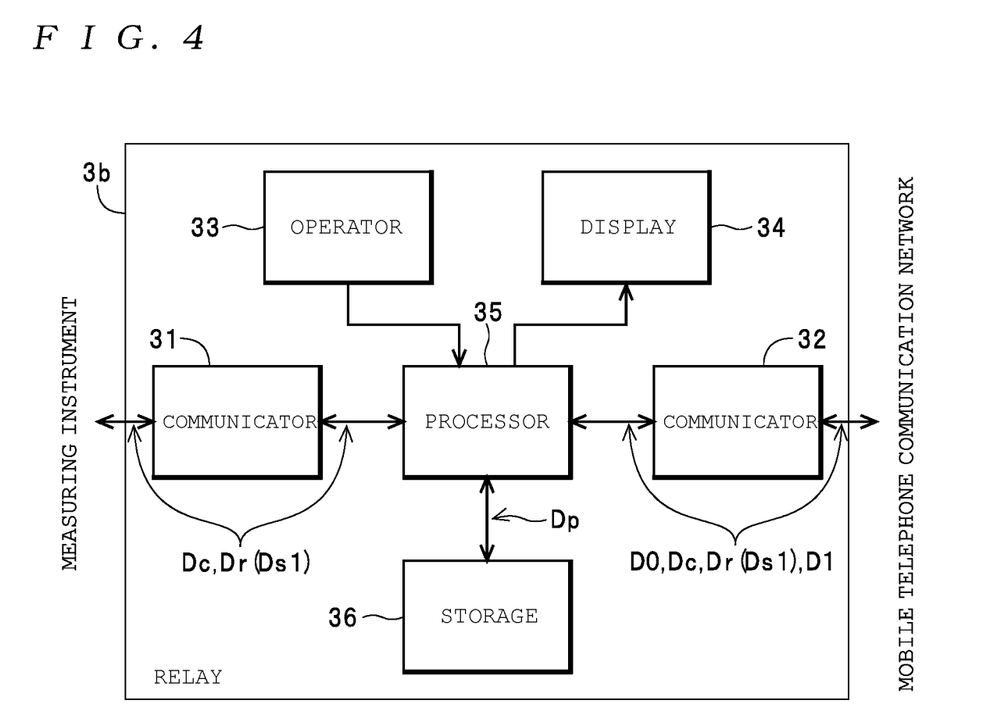
FIG. 4 is a diagram depicting the configuration of a relay 3b.

The relay 3b is one example of a "second processor that is locally connected to the electronic appliance and set up so as to be capable of access by the first processor via the Internet". In the remote operation system 3 according to the present embodiment, as one example the relay 3b is constructed of a mobile router in which program data Dp has been installed. As depicted in FIG. 4, the relay 3b includes communicators 31 and 32, an operator 33, a display 34, a processor 35, and storage 36.

As one example, the communicator 31 is constructed of a wired LAN communication module in the same way as the communicator 12 of each measuring instrument 1, and connects via a wired LAN cable to various network-connected appliances in accordance with control by the processor 35 to transmit and receive various data. Note that in place of the wired LAN communication module (or in addition to the wired LAN communication module), it is also possible to construct the communicator 31 so as to include a wireless LAN communication module and/or a wireless communication module that is compatible with Bluetooth (registered trademark) standard.

The communicator 32 is one example of a "communicator which connects to a mobile telephone communication network capable of connecting to the Internet", and in the same way as the communicator 22 of the operation terminal 2, is constructed of a wireless communication module that is capable of communication in accordance with a mobile communication standard such as 3G, 4G, or LTE. The communicator 32 transmits and receives various data via a mobile telephone communication network 54b in accordance with control by the processor 35. Note that although an example where the mobile telephone communication network 54a to which the communicator 22 of the operation terminal 2 connects and the mobile telephone communication network 54b to which the communicator 32 of the relay 3b connects are different is described here, it is also possible for the communicators 22 and 32 to connect to and operate on the same "mobile telephone communication network". In the following description, the mobile telephone communication networks 54a and 54b are referred to as the "mobile telephone communication network 54" when no distinction is made.

The operator 33 includes operation switches for setting operation conditions of the relay 3b and outputs operation signals in keeping with operations of the switches to the processor 35. The display 34 displays the operation state of the relay 3b in keeping with control by the processor 35.

The processor 35 performs overall control of the relay 3b. More specifically, the processor 35 controls the communicator 31 in accordance with program data Dp to transmit and receive various data to and from the respective measuring instruments 1, and controls the communicator 32 to transmit and receive various data to and from various external apparatuses via the mobile telephone communication network 54b and the Internet 51. Here, with the to the present embodiment, as one example the relay 3b is constdue to the processor 35 functioning as a DHCP server that assigns a local IP address to each measuring instrument 1, it is possible to construct a LAN 53 that is centered on the relay 3b. Note that control of the various components of the relay 3b by the processor 35 will be described in detail later.

The storage 36 stores the program data Dp and/or computation results and the like of the processor 35. Here, for the remote operation system 3 according to the present embodiment, as one example it is assumed that the relay 3b is provided by the manufacturer or retailer of the measuring instruments 1 in a state where the program data Dp has already been installed (that is, a state where the program data Dp that can be executed by the processor 35 has been stored in the storage 36).

Next, one example of the operation state of the measurement system 100 (the remote operation system 3) will be described. Note that it is assumed that preparation for use of the mobile telephone communication network 54 by the operation terminal 2 and/or relay 3b (that is, a contract procedure for using the mobile telephone communication network 54, attachment of a SIM card that is required to connect to the mobile telephone communication network 54, and the like) has already been completed. It is also assumed that connection of the broadband router 2a to the Internet 51 and preparation for connecting the operation terminal 2 to the broadband router 2a (that is, a setting operation for connecting the operation terminal 2 to the Internet 51 via the broadband router 2a) have also been completed. In addition, it is assumed that setting up of the relay server 3a (that is, installation of a program to run on the server, connection to the Internet 51, and the like) has been completed.

First, authentication information for users and identification information for used appliances (such as the measuring instruments 1 and the relay 3b) are registered in the relay server 3a. Although it is possible to perform this registration by directly operating the relay server 3a itself, registration is typically performed by using the operation terminal 2 described above or an information processing terminal aside from the operation terminal 2 (not illustrated) to access a dedicated address (that is, a URL for setting initial information) of the relay server 3a via the Internet 51.

In more detail, to register authentication information for users, as one example, a task of adding user IDs, which are individually assigned to individual users or to organizations to which users belong, and passwords to a list of "users permitted to access the relay server 3a" is performed. When doing so, as described later, dedicated URLs that are accessed when wishing to connect to the respective measuring instruments 1 are issued (hereinafter, such URLs are referred to as "connection starting URLs"). Regarding the URLs issued here, since the operation terminal 2 or the like performs encrypted communication when accessing and communicating with the relay server 3a as described later, the URLs are issued with a premise of communication (HTTPS communication) that uses SSL or the like. Also, although it is possible for the users themselves to perform the user registration process, from the viewpoint of security, as one example, the process is performed by the manager of the measurement system 100 (the remote operation system 3).

On the other hand, when registering identification information of the used appliances, as one example, in addition to the model numbers of the measuring instruments 1 and the relays 3b that participate in the measurement system 100, the MAC address of the communicator 12 in each measuring instrument 1, identification number (that is, the serial number) of the relays 3b, and arbitrary names that enable the user to easily identify the measuring instruments 1 and the relay 3b, information capable of specifying which measuring instruments 1 are connected to which relays 3b is registered so that all of such information is associated. When doing so, identification information for the registered used appliances is registered in the relay server 3a associated with the user IDs described above. Although it is also possible for the manager of the measurement system 100 (the remote operation system 3) to perform the registration process for the used appliances, to reduce the burden of the manager, as one example here, the registration described above is performed by users permitted to access the relay server 3a themselves.

Next, as one example, at the measurement locations (that is, the locations where the measuring instruments 1 are set up), the respective measuring instruments 1 (the communicators 12) registered as described above as used appliances and the relay 3b (the communicator 31) are connected to each other using wired LAN cables. After this, the power supplies of the measuring instruments 1 and the relay 3b are turned on.

At this time, in accordance with the program data Dp, the processor 35 of the relay 3b establishes a communication path that makes it possible to continuously receive transmission data from the relay server 3a via the Internet 51 and the mobile telephone communication network 54b (one example of a "first process" that establishes a "first communication path"). At this time, the processor 35 establishes a communication path capable of communication with the relay server 3a according to MQTT (Message Queue Telemetry Transport) communication, socket communication, web socket communication, or the like. By doing so, as described later, a state where various data transmitted from the relay server 3a can be received by the relay 3b at any time is produced, which completes the preparations for starting a measurement process using the measurement system 100.

On the other hand, when measurement processes are performed by the respective measuring instruments 1 and the measurement results are acquired, as one example, the operation terminal 2 is operated to access the relay server 3a. In more detail, first, the operator 23 of the operation terminal 2 is operated to launch the browser. Next, the connection starting URL (a URL that performs encrypted communication) mentioned earlier is inputted into the address bar of the browser and accessed. At this time, in a state where the operation terminal 2 is connected to the broadband router 2a, the operation terminal 2 accesses the relay server 3a via the communicator 21, the broadband router 2a and the Internet 51. In a state where the operation terminal 2 is not connected to the broadband router 2a, the operation terminal 2 accesses the relay server 3a via the communicator 22, the mobile telephone communication network 54a, and the Internet 51.

On the other hand, the relay server 3a first has a user authentication screen displayed on the terminal (in the present embodiment, the operation terminal 2) that made access to the connection starting URL and requests input of a user ID and a password. In response to this, the user inputs and transmits a user ID and a password into the authentication screen displayed on the display 24 of the operation terminal 2. At this time, since the communication between the operation terminal 2 and the relay server 3a is encrypted communication according to SSL or the like, a situation where the transmitted user ID and password (authentication method) are leaked is favorably avoided.

The relay server 3a determines whether authentication information that matches the transmitted authentication information has been registered (one example of an "authentication process"). Here, if matching authentication information has not been registered, the relay server 3a transmits screen information for the error message "There are no matching ID and password. First-time users should perform user registration." to the operation terminal 2 where the screen is displayed. By doing so, as necessary, the correct user ID and password are inputted or the user registration described earlier is performed.

On the other hand, when matching authentication information has been registered, the relay server 3a determines that access has been made by a user who is permitted to use the measurement system 100 (one example of "when it has been determined that access to the electronic appliance is permitted") and determines whether there is identification information of a measuring instrument 1 that has been registered in association with this authentication information. At this time, when there are a plurality of measuring instruments 1 with registered identification information, as one example, the relay server 3a transmits screen information that displays a "Which electronic appliance would you like to access?" message and a list of the registered measuring instruments 1 to the operation terminal 2 to have the user select the measuring instrument 1 to which communication with the operation terminal 2 is to be relayed.

When there is only one measuring instrument 1 with registered identification information or when an arbitrary measuring instrument 1 has been selected by the user out of a plurality of measuring instruments 1, the relay server 3a determines that start of remote operation of the measuring instrument 1 by the operation terminal 2 has been indicated and specifies, based on the identification information of the registered used appliance, the relay 3b that is connected to the target measuring instrument 1. Next, the relay server 3a transmits the control data D0 that indicates establishment of a "communication path that enables two-way communication between the measuring instrument 1 to which the user wishes to connect and the relay server 3a" via the "first communication path" that has been established as described earlier by the specified relay 3b to that relay 3b (one example of a "second process" that indicates establishment of a "second communication path").

In response to this, at the relay 3b, the processor 35 determines, in keeping with the program data Dp, whether the measuring instrument 1 of the control data D0 transmitted from the relay server 3a via the "first communication path" is connected to the communicator 31, and when the measuring instrument 1 is connected, establishes a "second communication path" for communication between the measuring instrument 1 and the relay server 3a (one example of a "third process"). At this time, as one example, the processor 35 uses HTTP communication between the measuring instrument 1 and the communicator 31, and establishes a communication path that performs HTTPS communication between the communicator 32 and the relay server 3a (in the present embodiment, between the mobile telephone communication network 54b and the Internet 51) as the "second communication path".

On the other hand, when the "second communication path" described above has been established by the relay 3b, the relay server 3a generates address data Da for a URL (hereinafter also referred to as the "remote operation URL") that is capable of accessing the measuring instrument 1 via the "second communication path" and transmits the generated address data Da together with screen information for displaying the remote operation URL to the operation terminal 2 (one example of a "fourth process"). In response to this, at the operation terminal 2, the message "Please access https://xxxxx to perform remote operation of the yyy measuring instrument." is displayed as one example on the display 24. By doing so, end-to-end communication becomes possible between the measuring instrument 1 connected to the relay 3b and the operation terminal 2.

Note that since the transmission of the address data Da and the like from the relay server 3a to the operation terminal 2 is performed by encrypted communication, the remote operation URL is favorably prevented from leaking. The character string "https://xxxxx" in the message described above is a shortcut indicating access to the remote operation URL. Accordingly, when remote operation of the measuring instrument 1 is desired, the user can start access to the remote operation URL by selecting a shortcut on the display 24 (that is, the browser) of the operation terminal 2.

At this time, when the operation terminal 2 is connected to the relay server 3a via the broadband router 2a and the Internet 51, the operation terminal 2 is connected to an arbitrary measuring instrument 1 via the broadband router 2a, the Internet 51, the relay server 3a, and "the second communication path" (a communication path via the Internet 51, the mobile telephone communication network 54b, and the relay server 3a). When the operation terminal 2 is connected to the relay server 3a via the mobile telephone communication network 54a and the Internet 51, the operation terminal 2 is connected to an arbitrary measuring instrument 1 via the mobile telephone communication network 54a, the Internet 51, the relay server 3a, and the "second communication path". Hereinafter, the communication path between the measuring instrument 1 and the operation terminal 2 described above is referred to as the "remote operation communication path".

In response to this, the measuring instrument 1 transmits screen information for a remote operation screen, which is set so as to be displayed on an external appliance such as the operation terminal 2 when such appliance accesses the measuring instrument 1, via the remote operation communication path to the operation terminal 2. By doing so, the remote operation screen is displayed on the display 24 of the operation terminal 2 and the procedure for accessing the measuring instrument 1 from the operation terminal 2 is complete. Here, virtual operation buttons (not illustrated) for giving various instructions such as an instruction for displaying a settings screen that sets conditions for the measurement process, instructions for starting and stopping a measurement process with the set conditions, and an instruction for transmitting measurement result data indicating the result of a measurement process are displayed in the remote operation screen.

Accordingly, when the user desires to set the conditions of the measurement process, the operator 23 of the operation terminal 2 is operated to select the virtual operation button for displaying the settings screen. At this time, the control data Dc that indicates displaying of the settings screen (data indicating that an operation of the virtual operation button has been performed: one example of "control data") is transmitted from the operation terminal 2 to the measuring instrument 1 via the remote operation communication path.

At the measuring instrument 1, when the control data Dc described above has been received, the processor 15 transmits screen information for the settings screen as the response data Dr (one example of "response data") via the remote operation communication path to the operation terminal 2. At this time, the response data Dr is relayed by the remote operation system 3 (that is, the relay server 3a and the relay 3b) and is transmitted from the measuring instrument 1 via the remote operation communication path to the operation terminal 2. By doing so, the settings screen (not illustrated) is displayed on the display 24 of the operation terminal 2. After this, every time the user refers to the settings screen displayed on the display 24 and designates an arbitrary setting condition, control data Dc indicating a change to the measuring condition is transmitted from the operation terminal 2 via the remote operation communication path to the measuring instrument 1, and screen information of the settings screen that reflects the conditions after the change is transmitted as the response data Dr from the measuring instrument 1 via the remote operation communication path to the operation terminal 2 (one example of "remote operation" of the measuring instrument 1 by the operation terminal 2).

When, in a state where the setting of conditions of the measurement process has been completed and the remote operation screen is displayed on the display 24 of the operation terminal 2, a measurement process by the measuring instrument 1 is to be started, the user operates the operator 23 of the operation terminal 2 to select the virtual operation button that starts the measurement process. At this time, control data Dc that indicates the start of a measurement process (data indicating that an operation of the virtual operation button has been performed: another example of "control data") is relayed by the remote operation system 3 (the relay server 3a and the relay 3b) and is transmitted from the operation terminal 2 to the measuring instrument 1 via the remote operation communication path.

At the measuring instrument 1, when the control data Dc described above is received, the processor 15 transmits response data Dr indicating that the instruction to start a measurement process has been received (another example of "response data") via the remote operation communication path to the operation terminal 2. At this time, the response data Dr is relayed by the remote operation system 3 (the relay server 3a and the relay 3b) and is transmitted from the measuring instrument 1 to the operation terminal 2 via the remote operation communication path. By doing so, a message (not illustrated) indicating that the measurement process is being performed is displayed on the display 24 of the operation terminal 2. Also, the processor 15 controls the meter 11 to start the measurement process. In response to this, the meter 11 successively outputs the measurement values Ds and the processor 15 successively stores the outputted measurement values Ds in the storage 16 (another example of "remote operation" of the measuring instrument 1 by the operation terminal 2).

On the other hand, when the measurement process has been performed for a desired time, the user operates the operator 23 of the operation terminal 2 to select a virtual operation button that stops the measurement process. At this time, control data Dc that indicates the stopping of the measurement process (data indicating that an operation of the virtual operation button has been performed: yet another example of "control data") is relayed by the remote operation system 3 (the relay server 3a and the relay 3b) and is transmitted from the operation terminal 2 to the measuring instrument 1 via the remote operation communication path.

At the measuring instrument 1, when the control data Dc described above is received, the processor 15 transmits response data Dr indicating that the instruction to stop a measurement process has been received (yet another example of "response data") via the remote operation communication path to the operation terminal 2. At this time, the response data Dr is relayed by the remote operation system 3 (the relay server 3a and the relay 3b) and is transmitted from the measuring instrument 1 to the operation terminal 2 via the remote operation communication path. By doing so, a message (not illustrated) indicating that the measurement process has stopped is displayed on the display 24 of the operation terminal 2. The processor 15 controls the meter 11 to stop the measurement process and generates the measurement result data Ds1 based on the measurement values Ds stored in the storage 16. By doing so, the measurement process is completed (yet another example of "remote operation" of the measuring instrument 1 by the operation terminal 2).

In addition, when the measurement result data Ds1 is to be transmitted from the measuring instrument 1 to the operation terminal 2 (that is, when the measurement value Ds is downloaded from the measuring instrument 1 by the operation terminal 2), the user operates the operator 23 of the operation terminal 2 to select a virtual operation button that indicates transmission of the measurement result data Ds1. At this time, the control data Dc that indicates transmission of the measurement result data Ds1 (data indicating that an operation of the virtual operation button has been performed: yet another example of "control data") is relayed by the remote operation system 3 (the relay server 3a and the relay 3b) and is transmitted from the operation terminal 2 to the measuring instrument 1 via the remote operation communication path.

At the measuring instrument 1, when the control data Dc described above is received, the processor 15 reads out the measurement result data Ds1 that was generated based on the measurement values Ds and stored in the storage 16 and transmits the measurement result data Ds1 as the response data Dr (yet another example of "response data") via the remote operation communication path to the operation terminal 2. At this time, the response data Dr is relayed by the remote operation system 3 (the relay server 3a and the relay 3b) and is transmitted from the measuring instrument 1 to the operation terminal 2 via the remote operation communication path. In response to this, at the operation terminal 2, the processor 25 stores the measurement result data Ds1 transmitted via the remote operation communication path in the storage 26. By doing so, acquisition of the measurement result data Ds1 is completed (yet another example of "remote operation" of the measuring instrument 1 by the operation terminal 2).

On the other hand, to end remote operation of the measuring instrument 1 by the operation terminal 2, as one example, the remote operation screen (browser) displayed on the display 24 of the operation terminal 2 is closed. At this time, data (one example of "control data indicating the end of remote operation") reporting that the remote operation screen (browser) has been closed is transmitted from the operation terminal 2 to the relay server 3a. Note that in place of an operation that closes the remote operation screen (browser), it is possible to provide a virtual operation button that indicates "the end of remote operation" on the remote operation screen and to indicate the end of remote operation by selecting this virtual operation button.

At this time, the relay server 3a determines that "control data indicating the end of remote operation" has been transmitted from the operation terminal 2 (one example of "when control data indicating the end of remote operation has been transmitted from an operation terminal performing remote operation of an electronic appliance") and transmits control data D1, which indicates a closing of the "second communication path" established by the "third process" described earlier, via the "first communication path" to the relay 3b (one example of a "fifth process"). In response to this, at the relay 3b, the processor 35 closes the "second communication path" in accordance with the program data Dp (one example of a "sixth process"). By doing so, the remote operation of the measuring instrument 1 by the operation terminal 2 ends.

At this time, the "first communication path" is not closed and remains established, thereby maintaining a state where various data transmitted from the relay server 3a can be received by the relay 3b at any time. Accordingly, when remote operation of one of the measuring instruments 1 connected to the relay 3b (a measuring instrument 1 that is the same as the measuring instrument 1 described above or a different measuring instrument 1 to the measuring instrument 1 described above) is desired, it is possible to perform remote operation of an arbitrary measuring instrument 1 using a procedure that is the same as the series of processes described above.

In this way, in the remote operation system 3, by executing the "first process" that establishes the "first communication path" that enables the relay 3b to receive transmission data from the relay server 3a via the Internet 51 at any time and the "second process" that instructs the relay 3b via the "first communication path" to establish a "second communication path" that enables the relay server 3*a* to perform end-to-end communication between the measuring instrument 1 and the operation terminal 2, remote operation of the measuring instrument 1 by the operation terminal 2 via the Internet 51 becomes possible.

More specifically, as one example, a measuring instrument 1 is remotely operated by an operation terminal 2 by the relay server 3*a* executing the "second process" when the start of remote operation of the measuring instrument 1 by the operation terminal 2 has been indicated from the operation terminal 2 that has accessed the relay server 3*a* via the Internet 51, the relay 3*b* executing the "third process" that establishes the "second communication path" that enables two-way communication between the measuring instrument 1 and the relay server 3*a* via the relay 3*b* in accordance with the instruction from the relay server 3*a* given by the "second process", the relay server 3*a* executing the "fourth process" that generates the address data Da that enables access to the measuring instrument 1 via the "second communication path" and transmits the address data Da via the Internet 51 to the operation terminal 2 to permit end-to-end communication between the measuring instrument 1 and the operation terminal 2, the relay server 3*a* and the relay 3*b* relaying the control data Dc transmitted by the operation terminal 2 accessing the address in the address data Da to the measuring instrument 1, and the relay server 3*a* and the relay 3*b* relaying the response data Dr transmitted by the measuring instrument 1 to the operation terminal 2. The measurement system 100 includes the measuring instruments 1, the operation terminal 2 and the remote operation system 3, and is configured so as to be capable of executing at least one of the measurement process by a measuring instrument 1 and a transmission process of measurement result data Ds1 from a measuring instrument 1 to the operation terminal 2 through remote operation by the operation terminal 2.

From the above, according to the remote operation system 3 and the measurement system 100, in the same way as the invention disclosed in the patent literature cited earlier, it is unnecessary to fix the IP addresses of the measuring instruments 1 or specify the IP addresses of the measuring instruments 1, and possible, by reliably relaying the transmission and receiving of the control data Dc and the response data Dr between the measuring instrument 1 and the operation terminal 2 via the "second communication path" established by the relay 3*b*, to reliably remotely operate the measuring instrument 1 via the Internet 51 using the operation terminal 2 or the like. Also, since it is not necessary to provide the measuring instrument 1 with an e-mail transmission function or an IP address notifying function, it is possible to sufficiently reduce the manufacturing cost of the measuring instrument 1. In addition, since no notification of the IP addresses assigned to the measuring instruments 1 is given using e-mail or the like, it is possible to favorably avoid a situation where the IP addresses of the measuring instruments 1 leak and are subjected to unauthorized access.

Also, according to the remote operation system 3 and the measurement system 100, due to the relay 3*b* establishing the "second communication path" that is capable of encrypted communication in the "third process", it is possible to even more favorably avoid a situation where someone aside from authorized users can see the operation state of a measuring instrument 1 and/or make unauthorized access to the measuring instrument 1 and perform a remote operation.

In addition, according to the remote operation system 3 and the measurement system 100, due to the relay server 3*a* executing encrypted communication when communicating via the Internet 51 with the operation terminal 2, it is possible to favorably avoid a situation where someone aside from authorized users can see the operation state of the measuring instrument 1 and/or make unauthorized access to the measuring instrument 1 and perform a remote operation.

Also, according to the remote operation system 3 and the measurement system 100, due to the relay server 3*a* executing the "fifth process" that instructs, via the "first communication path", the relay 3*b* to close the "second communication path" when control data Dc that indicates the end of the remote operation has been transmitted from the operation terminal 2 that is performing remote operation of the measuring instrument 1 and the relay 3*b* executing the "sixth process" that closes the "second communication path" in accordance with the instruction from the relay server 3*a*, it is possible, in response to the risk of unauthorized access to the measuring instrument 1 being performed using the "second communication path" which could occur if a state where the "second communication path" is established were maintained even after the end of remote operation, to close the "second communication path" when the "second communication path" is no longer needed and thereby favorably prevent such unauthorized access.

In addition, according to the remote operation system 3 and the measurement system 100, due to the relay server 3*a* executing an authentication process when the operation terminal 2 has accessed the relay server 3*a* via the Internet 51 and executing the "second process" when it has been determined that access to the measuring instrument 1 is permitted, use of the measurement system 100 by someone aside from authorized users is reliably prevented, and as a result, it is possible to more favorably prevent a situation where someone aside from authorized users can see the operation state of the measuring instrument 1 and/or make unauthorized access to the measuring instrument 1 and perform a remote operation.

According to the remote operation system 3 and the measurement system 100 equipped with the remote operation system 3, by constructing the relay 3*b* so as to include the communicator 32, which connects to the mobile telephone communication network 54*b* that is capable of connecting to the Internet 51, and therefore be capable of connecting to the relay server 3*a* via the mobile telephone communication network 54*b* and the Internet 51, it is possible to easily use the remote operation system 3 and the measurement system 100 even when a local area network capable of connecting to the Internet 51 is not constructed and when use of an existing local area network capable of connecting to the Internet 51 is not permitted.

Also, by having the relay 3*b* of the remote operation system 3 execute the "first process", the "third process", and the relaying process for the control data Dc and the response data Dr according to the program data Dp, since it is possible to install the program data Dp using an existing appliance capable of executing the program data Dp and have this appliance operate as the "second processor", it is possible to reduce the installation cost of the remote operation system 3 and the measurement system 100.

Note that the configurations of the "remote operation system" and the "measurement system" according to the present invention are not limited to the example configurations of the remote operation system 3 and the measurement system 100 described above.

As one example, although an example where the relay 3*b* executes a process that establishes a communication path that complies to MQTT communication or the like with the relay server 3a as the "first process" has been described, in place of this configuration, it is also possible to use a configuration that establishes and maintains "a first communication path that enables reception of transmission data via the Internet from the first processor at any time" by regularly transmitting some kind of data by HTTP (or HTTPS) communication from the relay 3b to the relay server 3a and/or the relay 3b regularly receiving some kind of data by HTTP (or HTTPS) communication from the relay server 3a.

Also, although a remote operation system 3 configuration that includes the relay 3b constructed of a mobile router as the "second processor" has been described as an example, the configuration of the "second processor" is not limited to this and it is also possible to install the program data Dp into a general-purpose information processing terminal (such as a personal computer, a tablet terminal, or a smartphone) equipped with a communication module for connecting to the Internet 51 and a communication module capable of connecting to the measuring instrument 1 and have such terminal operate as the "second processor". In this case, the configuration for connecting the "second processor" to the "Internet" is not limited to a configuration, like the communicator 32 of the relay 3b, that connects via a "mobile telephone communication network" and it is also possible to use a configuration that is capable of directly connecting to the "Internet" or indirectly connecting via a broadband router or the like.

In addition, although a configuration for remote operation of the measuring instruments 1 that are one example of "electronic appliances" has been described above, it is also possible to use a configuration for remote operation of various "electronic appliances" aside from "measuring instruments". In more detail, it is possible to use a configuration for remote operation from an "operation terminal" via the "Internet", with a general-purpose appliance such as a printer, a Web camera, and a personal computer, a management apparatus that manages factory equipment and/or security equipment, and a control apparatus of manufacturing equipment or the like as examples of the "electronic appliances" to be operated.

Also, although examples of "remote operations" that cause a measuring instrument 1 to execute processes such as the setting of a measurement process, the starting and stopping of a measurement process, and transmission or the like of the measurement result data Ds1 have been described, the "process set in advance" is not limited to the example processes described above and it is possible to have various processes executed at an "electronic appliance (measuring instrument)" by a remote operation.

Moreover, the invention encompasses any possible combination of some or all of the various embodiments and the modification examples described herein and incorporated herein.

It is possible to achieve at least the following configurations from the above-described example embodiments and the modification examples of the disclosure.

(1) A remote operation system that enables remote operation of an electronic appliance, which is capable of executing a process set in advance in keeping with control data from an external apparatus and outputting response data relating to the process set in advance to the external apparatus, via the Internet by an operation terminal as the external apparatus that is capable of accessing arbitrary resources connected to the Internet, the remote operation system comprising:

a first processor connected to the Internet; and
a second processor that is locally connected to the electronic appliance and set up so as to be capable of access by the first processor via the Internet, wherein the second processor executes a first process that establishes a first communication path that enables reception of transmission data via the Internet from the first processor at any time, and the first processor executes a second process that instructs the second processor via the first communication path to establish a second communication path for performing end-to-end communication between the electronic appliance and the operation terminal to enable remote operation of the electronic appliance by the operation terminal via the Internet.

(2) The remote operation system according to (1),
wherein the first processor executes the second process when a start of remote operation of the electronic appliance by the operation terminal has been indicated by the operation terminal that has accessed the first processor via the Internet, the second processor executes a third process that establishes the second communication path that enables two-way communication between the electronic appliance and the first processor via the second processor in accordance with an instruction from the first processor given by the second process, the first processor executes a fourth process that generates address data that enables access to the electronic appliance via the second communication path established by the third process and transmits the address data via the Internet to the operation terminal and permits end-to-end communication between the electronic appliance and the operation terminal, and the electronic appliance is remotely operated by the operation terminal by relaying the control data, which has been transmitted by the operation terminal accessing an address in the address data, to the electronic appliance using the first processor and the second processor and relaying the response data transmitted by the electronic appliance to the operation terminal using the first processor and the second processor.

(3) The remote operation system according to (2),
wherein in the third process, the second processor establishes the second communication path that is capable of encrypted communication.

(4) The remote operation system according to any of (1) to (3),
wherein the first processor executes encrypted communication when communicating with the operation terminal via the Internet.

(5) The remote operation system according to any of (1) to (4),
wherein the first processor executes a fifth process that gives an instruction, via the first communication path, to the second processor to close the second communication path when the control data indicating an end of remote operation has been transmitted from the operation terminal that is performing remote operation of the electronic appliance, and the second processor executes a sixth process that closes the second communication path in accordance with the instruction from the first processor.

(6) The remote operation system according to any of (1) to (5),
wherein the first processor executes an authentication process when the operation terminal has accessed the first processor via the Internet and executes the second process when it has been determined that access to the electronic appliance is permitted.

(7) The remote operation system according to any of (1) to (6),
wherein the second processor includes a communicator, which connects to a mobile telephone communication network capable of connecting to the Internet, and is configured to be capable of connecting to the first processor via the mobile telephone communication network and the Internet.

(8) A measurement system comprising:
the remote operation system according to any of (1) to (7);
a measuring instrument as the electronic appliance; and
the operation terminal,
wherein the measurement system is configured so as to be capable of executing, by remote operation by the operation terminal, at least one of:
a measurement process by the measuring instrument; and
a transmission process from the measuring instrument to the operation terminal of a result of the measurement process.

What is claimed is:

1. A remote operation system that enables remote operation of an electronic appliance configured to execute a predetermined process in keeping with control data from an external apparatus and further configured to output response data relating to the predetermined process to the external apparatus, via the Internet by an operation terminal as the external apparatus that is configured to access arbitrary resources connected to the Internet, the remote operation system comprising:
a first processor connected to the Internet; and
a second processor that is locally connected to the electronic appliance and configured such that the first processor accesses the second processor via the Internet,
wherein the second processor executes a first process that establishes a first communication path that enables reception of transmission data via the Internet from the first processor at any time, and
the first processor executes a second process that instructs the second processor via the first communication path to establish a second communication path for performing end-to-end communication between the electronic appliance and the operation terminal to enable remote operation of the electronic appliance by the operation terminal via the Internet.

2. The remote operation system according to claim 1,
wherein the first processor executes the second process when a start of remote operation of the electronic appliance by the operation terminal has been indicated by the operation terminal that has accessed the first processor via the Internet,
the second processor executes a third process that establishes the second communication path that enables two-way communication between the electronic appliance and the first processor via the second processor in accordance with an instruction from the first processor given by the second process,
the first processor executes a fourth process that generates address data that enables access to the electronic appliance via the second communication path established by the third process and transmits the address data via the Internet to the operation terminal and permits end-to-end communication between the electronic appliance and the operation terminal, and the electronic appliance is remotely operated by the operation terminal by relaying the control data, which has been transmitted by the operation terminal accessing an address in the address data, to the electronic appliance using the first processor and the second processor and relaying the response data transmitted by the electronic appliance to the operation terminal using the first processor and the second processor.

3. The remote operation system according to claim 2,
wherein in the third process, the second processor establishes the second communication path that is configured such that communication is encrypted.

4. The remote operation system according to claim 1,
wherein the first processor executes encrypted communication when communicating with the operation terminal via the Internet.

5. The remote operation system according to claim 2,
wherein the first processor executes encrypted communication when communicating with the operation terminal via the Internet.

6. The remote operation system according to claim 3,
wherein the first processor executes encrypted communication when communicating with the operation terminal via the Internet.

7. The remote operation system according to claim 1,
wherein the first processor executes a fifth process that gives an instruction, via the first communication path, to the second processor to close the second communication path when the control data indicating an end of remote operation has been transmitted from the operation terminal that is performing remote operation of the electronic appliance, and
the second processor executes a sixth process that closes the second communication path in accordance with the instruction from the first processor.

8. The remote operation system according to claim 2,
wherein the first processor executes a fifth process that gives an instruction, via the first communication path, to the second processor to close the second communication path when the control data indicating an end of remote operation has been transmitted from the operation terminal that is performing remote operation of the electronic appliance, and
the second processor executes a sixth process that closes the second communication path in accordance with the instruction from the first processor.

9. The remote operation system according to claim 1,
wherein the first processor executes an authentication process when the operation terminal has accessed the first processor via the Internet and executes the second process when it has been determined that access to the electronic appliance is permitted.

10. The remote operation system according to claim 2,
wherein the first processor executes an authentication process when the operation terminal has accessed the first processor via the Internet and executes the second process when it has been determined that access to the electronic appliance is permitted.

11. The remote operation system according to claim 1,
wherein the second processor includes a communicator, which connects to a mobile telephone communication network configured to connect to the Internet, and is configured to connect to the first processor via the mobile telephone communication network and the Internet.

12. The remote operation system according to claim 2,
wherein the second processor includes a communicator, which connects to a mobile telephone communication network configured to connect to the Internet, and is configured to connect to the first processor via the mobile telephone communication network and the Internet.

13. A measurement system comprising:
the remote operation system according to claim 1;
a measuring instrument as the electronic appliance; and
the operation terminal,
wherein the measurement system is configured to execute, by remote operation by the operation terminal, at least one of:
a measurement process by the measuring instrument; and
a transmission process from the measuring instrument to the operation terminal of a result of the measurement process.

14. A measurement system comprising:
the remote operation system according to claim 2;
a measuring instrument as the electronic appliance; and
the operation terminal,
wherein the measurement system is configured to execute, by remote operation by the operation terminal, at least one of:
a measurement process by the measuring instrument; and
a transmission process from the measuring instrument to the operation terminal of a result of the measurement process.

\* \* \* \* \*